United States Patent [19]

Wong et al.

[11] Patent Number: 5,088,390
[45] Date of Patent: Feb. 18, 1992

[54] AUTOMATIC FOOD COOKING DEVICE

[75] Inventors: Henry Wong, 3704 Emily St., Kensington, Md. 20895; Peng W. Zhou, Arlington, Va.

[73] Assignee: Henry Wong, Kensington, Md.

[21] Appl. No.: 470,721

[22] Filed: Jan. 26, 1990

[51] Int. Cl.⁵ .............................................. A47J 27/00
[52] U.S. Cl. ........................................ 99/327; 99/332; 99/335
[58] Field of Search ................. 99/348, 395, 396, 407, 99/408, 327, 332, 335, 348, 644, 331, 325, 409, 427; 366/237, 239, 240, 127, 114; 222/145, 136, 135, 137

[56] References Cited

U.S. PATENT DOCUMENTS

| | | |
|---|---|---|
| 2,674,180 | 4/1954 | Ekman . |
| 3,298,302 | 1/1967 | Fries . |
| 3,608,473 | 9/1971 | Kearn . |
| 3,688,684 | 9/1972 | Piedallu . |
| 3,744,475 | 7/1973 | Myler . |
| 3,870,193 | 3/1975 | Schneider . |
| 4,099,454 | 7/1978 | Theimer et al. ............. 99/358 |
| 4,203,357 | 5/1980 | Vaussanvin . |
| 4,450,757 | 5/1984 | Alfio . |
| 4,503,502 | 3/1985 | Chapin ......................... 99/335 |
| 4,561,346 | 12/1985 | Marquer . |
| 4,594,941 | 6/1986 | Anderson . |
| 4,700,617 | 10/1987 | Lee . |
| 4,704,956 | 11/1987 | Gill . |
| 4,719,850 | 1/1988 | Sowell . |
| 4,821,631 | 4/1989 | Wong . |
| 4,919,950 | 4/1990 | Mak ............................. 99/348 |

Primary Examiner—Philip R. Coe
Assistant Examiner—Patrick F. Brinson
Attorney, Agent, or Firm—Shlesinger, Arkwright & Garvey

[57] ABSTRACT

A cooking device, comprises a base; a fulcrum mounted on the base; a support for carrying a pan, the support being mounted on the fulcrum and including first and second portions extending respectively from each side of the fulcrum a substantial distance; device for mounting the pan on the first portion; and an actuator operably associated with the second portion for periodically accelerating and decelerating rapidly the first portion about the fulcrum between first and second positions, thereby causing the pan to move upwardly and downwardly with the first portion and propel food placed therein into the air upon rapid upward deceleration and downward acceleration of the first portion and causing the food to be turned for uniform heating of different portions of the food.

23 Claims, 3 Drawing Sheets

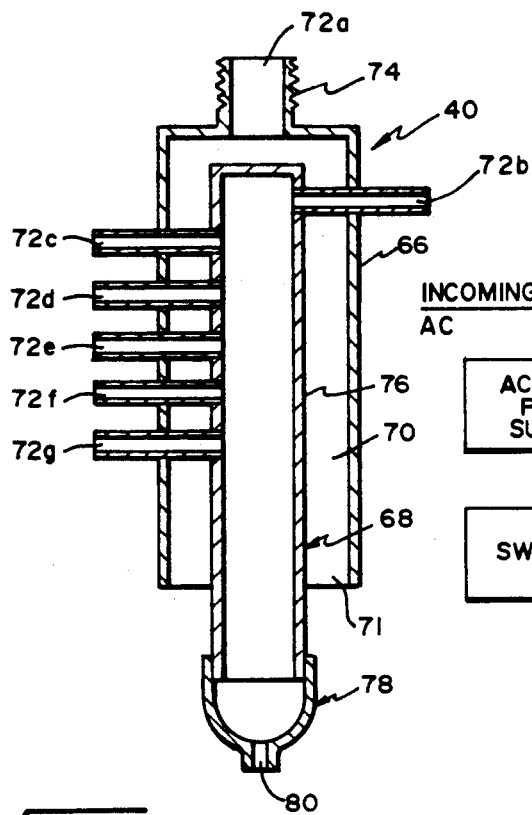
FIG. 3
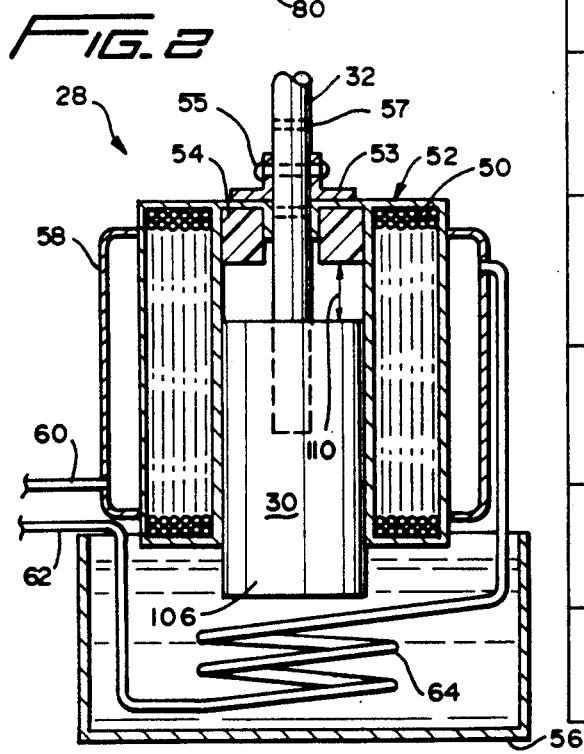
FIG. 2
FIG. 4

AUTOMATIC FOOD COOKING DEVICE

FIELD OF THE INVENTION

The present invention relates generally to the field of cooking devices having stirring mechanism and particularly to cooking devices for cooking Oriental dishes requiring constant stirring.

BACKGROUND OF THE INVENTION

It is well known to those skilled in the art of cooking Oriental dishes such as Chinese food that constant stirring of the food being cooked is absolutely required to provide even cooking and to prevent overcooking. When preparing Chinese food, it is often common to use a cooking pan called a wok, which is an open top, concave frying pan. When using the wok, it is normal to constantly agitate it by hand in a specific fashion to stir the food particles being cooked and to continually propel them into the air. The agitating motion requires years of practice to perfect and varies between cooks. It is not surprising, then, that food prepared from the same recipe does not taste or look the same when prepared by different cooks, largely because of the difference in the agitating motion that each cook imparts to the wok when cooking. Thus, consistency in the food being cooked is difficult to maintain when different cooks are involved.

OBJECTS AND SUMMARY OF THE INVENTION

It is therefore an object of the present invention to provide an automatic cooking device for preparing Oriental dishes, including Chinese food, that provides an automatic agitating and stirring to the food being cooked.

It is another object of the present invention to provide an automatic cooking device with automatic agitating and stirring to the food being cooked, wherein the degree of agitating and stirring is adjustable to suit the food being cooked.

It is still another object of the present invention to provide an automatic cooking device that will provide substantially uniformly prepared food, regardless of the level of skill of the cook.

It is yet another object of the present invention to provide an automatic cooking device which requires minimum attention and effort from a cook during the cooking cycle.

It is an object of the present invention to provide an automatic cooking device which automatically dispenses preselected cooking liquids at preselected time at preselected amounts.

It is another object of the present invention to provide an automatic cooking device which requires a relatively less experienced cook to operate.

It is still another object of the present invention to provide an automatic cooking device which is completely automatic during the cooking cycle.

It is yet another object of the present invention to provide an automatic cooking device which is relatively inexpensive to manufacture.

It is an object of the present invention to provide an automatic cooking device which prepares an Oriental dish the same way repeatedly, thereby promoting uniformity and efficiency.

In summary, the present invention provides an automatic cooking device having an automatic and adjustable agitating and stirring function and an automatic dispensing of cooking liquids, thereby enabling preparation of Oriental dishes uniformly, consistently and efficiently and making the operation of a Chinese fast food restaurant feasible.

These and other objects of the present invention will become apparent from the following detailed description.

BRIEF DESCRIPTION OF THE DRAWINGS

FIG. 2 is cross-sectional view of a solenoid used in the present invention.

FIG. 3 is a cross-sectional view of a nozzle used in the present invention.

FIG. 4 is functional block diagram of a control circuit used in the present invention.

DETAILED DESCRIPTION OF THE INVENTION

Figure 1

Figure 1:
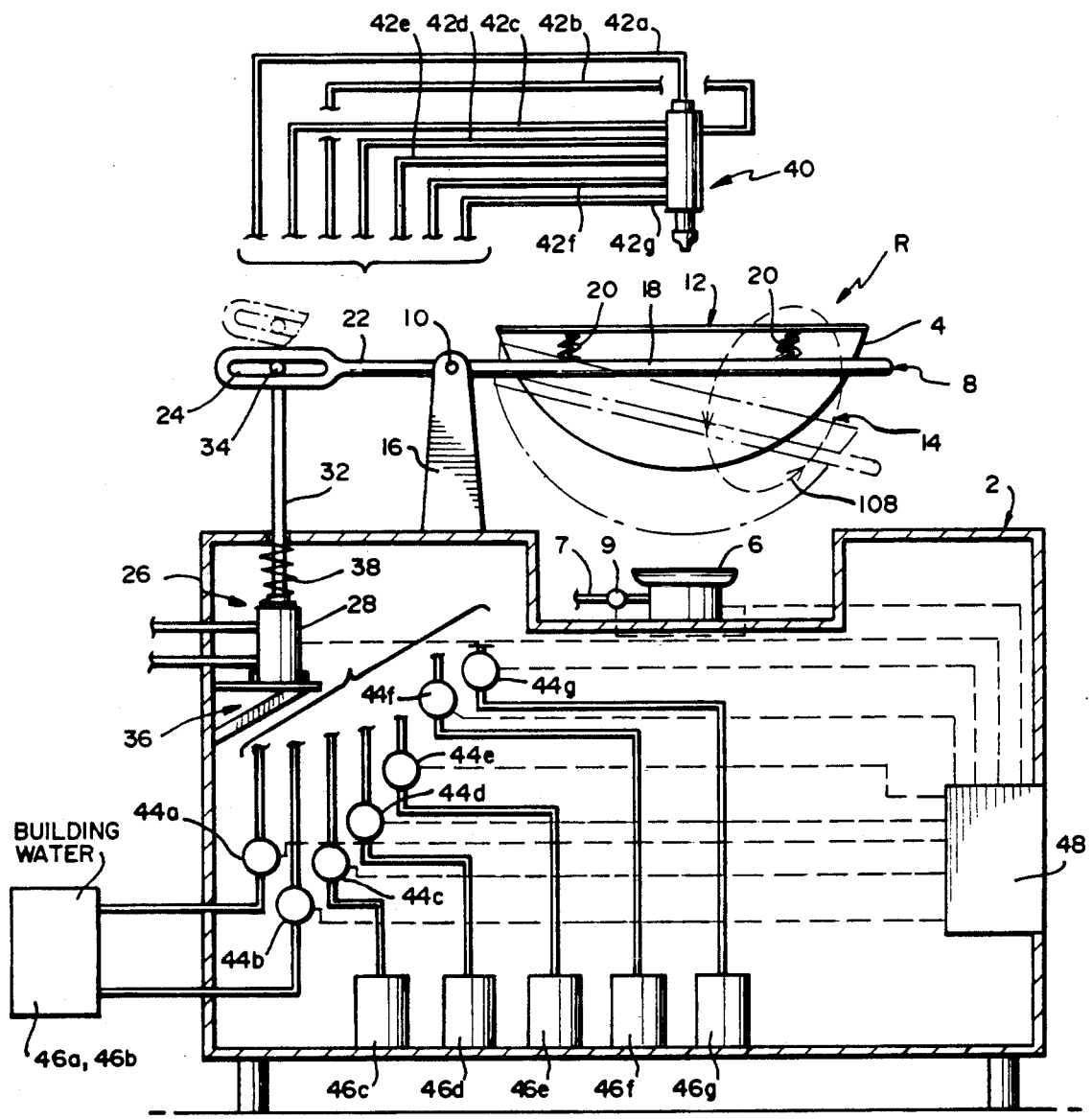
FIG. 1 is side elevational view, partly schematic and with portions shown in cross-section, of an automatic cooking device according to the present invention.

An automatic cooking device R according to the present invention is disclosed in FIG. 1. The cooking device R includes a base 2 for proving an overall structural framework. A pan 4, preferably a Chinese wok, is disposed above a burner 6. The burner 6 is secured to the base 2 in a conventional manner and is hooked up to a gas line 7. A solenoid valve 9 controls the gas flow to the burner 6. The pan 4 is supported by pan support 8 which is pivotable about a fulcrum or pivot 10 between a position 12, where the pan is substantially horizontal and a position 14, where the pan makes an angle with the horizontal. The pivot 10 is secured to a bracket 16 which in turn is secured to the base 2. The pan support 8 preferably includes a ring portion 18 which has a smaller diameter than the rim of the pan 4, thereby permitting the pan 4 to rest within the ring portion 18. Springs 20 or other conventional means are used to removably secure the pan 4 to the pan support 8. One skilled in the art will understand that the pan support 8 may be permanently secured to the pan 4, as by welding, riveting, nut and bolt, etc., in which case the ring portion 18 and the springs 20 become unnecessary. The pan support 4 further includes a portion 22 which extends away from and beyond the pan 4. The ring portion 18 can be advantageously substantially longer than the portion 22, as viewed in FIG. 1, thereby permitting magnification of a small movement of the portion 22 into a large movement in the ring portion 18. The pivot 10 is located in the portion 22. A lost motion slot 24 is disposed at the free end of the portion 22.

A drive mechanism 26 is operably associated with the pan support 8 to provide the necessary accelerating and decelerating oscillatory motion to the pan 4. The drive mechanism 26 includes a solenoid 28 having a plunger 30 which is secured to a rod 32, as best shown in FIG. 2. The rod 32 includes a pin 34 at its free end and is engaged in the slot 24. A bracket 36 secured to the base 2 provides support to the solenoid 28. Spring 38 which is axially disposed relative to the rod 32 biases the pan 4 in the horizontal position 12.

A nozzle 40 is disposed over the pan 4, as best shown in FIG. 1. The nozzle 40 includes a plurality of inlet lines 42a through 42g for dispensing cooking liquid, such as oil, water, sauce, etc., into the pan 4 during the cooking process and for dispensing water for cleaning the pan 4 after each cooking cycle. Each inlet lines 42a-42g is controlled by respective solenoid valves 44a through 44g disposed in-line of the inlet lines. Each of the inlet lines 42a-42g is connected to respective fluid supplies 46a through 46g which include means (not shown) for causing the fluid to flow through the respective inlet lines to the nozzle 40 when the respective solenoid valves 44a-44g are opened. The fluid supplies may include bottled carbon dioxide, cooking oil, sauce no. 1, sauce no. 2, sauce no. 3, water, or other cooking liquids used in preparation of the food being cooked. Each of the solenoid valves 44a-44g is controlled from a panel 48 which includes control circuit 49, as best shown in FIG. 4, to automatically operate the cooking device R throughout a cooking cycle. The solenoid 28 and the burner gas solenoid valve 9 are also controlled from the panel 48.

Figure 2

The solenoid 28 includes a coil 50 wound around a spool 52. The plunger 30 fits within the spool 52 and slides therein between a retracted position and an extended position. An annular resilient material 54 is disposed within the spool 52 and acts as a shock absorber for the plunger 30. An oil pan 56 is disposed below the solenoid 28. A coolant jacket 58 surrounds the solenoid 28. An inlet line 60 and an outlet line 62 which are connected to the jacket 58 permit circulation of a cooling liquid through the jacket 58, thereby providing cooling means to the solenoid 28. The outlet line 62 includes a coil portion 64 which is disposed within the oil pan 56. The coil portion 64 provides cooling to the lubricating oil in the oil pan 56. A flanged sleeve 53 is axially secured to the rod 32 with a nut and bolt 55 disposed through one of a plurality of axially spaced diametrical holes 57.

Figure 3

The nozzle 40 includes an outer tubular member 66 and an inner tubular member 68. The inner diameter of the tubular member 66 is greater than the outside diameter of the tubular member 68, thereby creating an annular passageway 70 therebetween which communicates with an annular opening 71. The tubular member 66 is closed off at the top end and open at the bottom end with the annular opening 71. The top end of the tubular member 66 includes an inlet opening 72a with an outer thread 74 for facilitating connection with the inlet line 42a.

The inner tubular member 68 includes a body portion 76 and a nozzle portion 78. The upper end of the tubular member 68 is closed off and the lower end includes a nozzle portion 78 with an opening 80 which is substantially smaller than the interior diameter of the body portion 76. A plurality of inlets 72b through 72g are transversely secured to the body portion 76 and communicate with the inner chamber of the tubular member 68. The inlets 72b-72g are connected to the respective inlet lines 42b-42g.

Figure 4

A functional block diagram of the control circuit 49 is disclosed in FIG. 4. A power supply 84 converts incoming AC power to DC power. A switch 86 disposed in the panel 48 controls the operation of the water solenoid valve 44a. Another switch 88 controls a plurality of timers 90, 92, 94, 96, 98, 100, 102 and 104. The timer 90 controls the solenoid 28. The timer 94 controls the flow of fuel gas to the burner 6. Each of the other timers controls the opening and closing of the respective solenoid valves.

Figure 5:
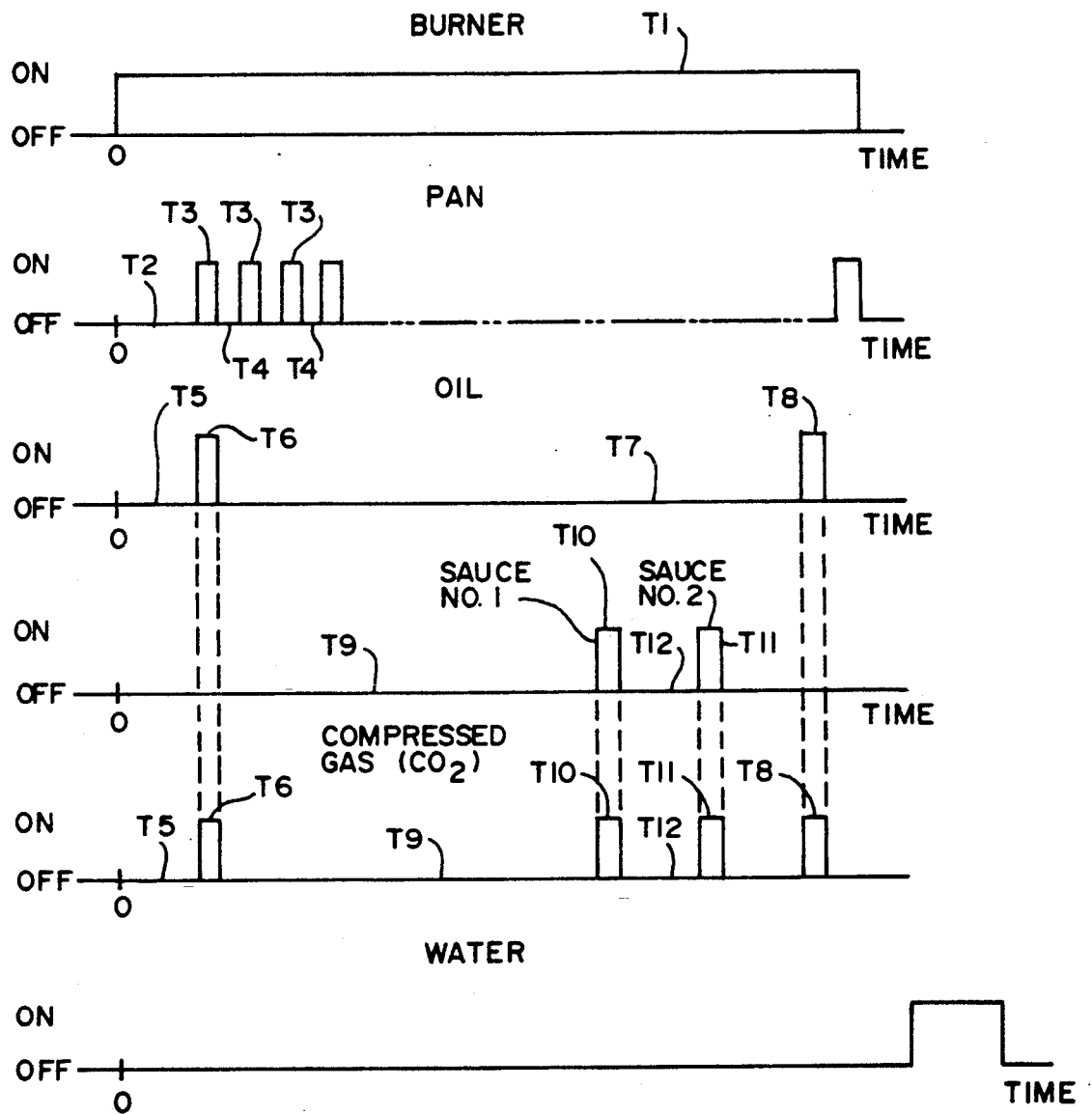
FIG. 5 is a schematic chart showing one mode of operation of the cooking device.

Each of the timers 90, 92, 94, 96, 100, 102 and 104 can be preset to operate in a predetermined sequence, as for example shown in FIG. 5.

OPERATION

Figure 5

The cooking device R is started from the control panel 48. The burner 6 is turned on through the operation of the burner solenoid valve 110. The timer 92 determines the amount of on time T1 during the cooking cycle. After a predetermined period of time T2, the solenoid 28 is automatically periodically operated by the timer 90. The solenoid 28 is repeatedly energized for one period of time T3 and repeatedly de-energized for another period of time T4. The on time T3 and the off time T4 are independently adjustable, thereby permitting the modulation of the oscillatory motion imparted to the pan 4 in order to suit the nature of the food being cooked. The pan 4 in the position 14 during time T3, and in the position 12 during time T4. By adjusting the times T3 and T4, the pan 4 is made to stay in either positions 12 or 14 at a longer or shorter time, depending on the requirement of the food being cooked.

When the solenoid 28 is energized, the plunger 30 is pulled into the spool by the coil 50, thereby compressing the spring 38. After on time T3, the timer 90 de-energizes the solenoid 28, thereby allowing the compressed spring 38 to push the plunger 30 to its extended starting position. After off time T4, the solenoid 28 is again energized by timer 90 for time T3, causing the plunger 30 to be drawn again into the coil 50. At the end of the time T3, the timer 90 again de-energizes the solenoid 28, permitting the compressed spring 38 to bring the plunger 32 to its starting position. With each motion of the plunger 30, the rod 32 causes the pan support 8 to pivot periodically about pivot 10. With each upward and downward motion of the pan support 8, food placed inside the pan 4 is propelled into the air, thereby causing the mixing and even cooking of the food.

The solenoid 28, the spring 38, the position of the flanged sleeve 53 along the rod 32, the diameter of the pan 4 and other factors determine the acceleration and deceleration forces exerted on the food particles in the pan 4 during the oscillatory motion of the pan 4 imparted by the on/off action of the solenoid 28. The food particles are tossed into the air when the pan 4 is brought to a sudden stop on its upward motion from the position 14 to the horizontal position 12. The food particles are again tossed in the air when the pan 4 abruptly moves from the horizontal position 12 to the inclined position 14. The food particles will trace a trajectory as generally indicated in dashed lines at 108, as best shown in FIG. 1, from the accelerating and decelerating forces imparted by the solenoid 28 and the spring 38. By locating the pan 4 an appropriate distance from the pivot 10, the accelerating and decelerating forces available at the far end of the pan 4 may be changed. The farther away the pan 4 from the pivot 10, the greater the distance the pan 4 travels between the positions 12 and 14 with each movement of the portion 22, thereby imparting greater velocities to the far end of the pan 4. Greater velocities generate greater accelerating and decelerating forces.

The distance generally indicated at 110 dictates the amount of travel of the plunger 30 within the spool 52. The distance 110 is adjustable by repositioning the flanged sleeve 53 along the rod 32. Adjustment of the distance 110 will change the accelerating and decelerating forces imparted to the food particles in the pan 4, thereby changing the trajectory 110 and the cooking characteristics of the cooking device R.

As the plunger 30 slides back and forth within the spool 52, the lower portion 104 of the plunger 30 contacts the oil in the oil pan 56. Due to adhesion of the oil to the plunger lower portion 106, the plunger 30 is thereby lubricated, permitting reduction of friction losses between the plunger surface and the spool surface. The resilient material 54 absorbs the impact of the plunger as it travels upwardly when the solenoid 28 is energized.

Cooling fluid introduced through inlet line 60 circulates around the outer housing of the spool 52 and exits through outlet line 62. The inlet line 60 is advantageously disposed at a lower portion of the jacket 58, and the outlet line 62 is advantageously exits at the upper of the jacket 58, to take advantage of effects of convection within the jacket 58. The cooling liquid circulates through the coil portion 64 of the outlet line 62 and provides means for cooling the oil in the oil pan 56.

As the pan 4 continues to oscillate about the pivot 10, several cooking fluids are selectively introduced to the food in the pan 4 by means of the nozzle 40. At certain predetermined time, timers 92, 96, 98, 100, 102 and 104 are selectively activated to open and close the respective solenoid valves for a specific period of time so that a measured amount of cooking liquid is dispensed unto the food being cooked. As an example, after time T5 when the pan 4 reaches its cooking temperature after the burner 6 is started, cooking oil is dispensed for time T6 and again for time T8 after an elapsed time T7. During times T6 and T8, pressurized gas, such as carbon dioxide is introduced into the nozzle 40. The pressurized carbon dioxide helps atomize the oil for even distribution on the pan surface. Preferably, carbon dioxide is fed into the nozzle 40 at the upper inlet line 72b, as best shown in FIG. 3.

After another time T9, sauce number 1 is dispensed for time T10 by the closing and opening of the solenoid valve 44e which is activated by the timer 98. Sauce no. 2 is subsequently dispensed for time T11 after time T12 through the operation of the solenoid valve 44f which is operated by the timer 100. The time periods T9, T10, T11 and T12 are adjustable, thereby permitting adjustment of the amount of liquid that is dispensed and when it is dispensed. Pressurized carbon dioxide is introduced into the nozzle 40 at the same time as the sauce no. 1 and sauce no. 2 are dispensed to permit atomization and even distribution of the sauce over the food being cooked.

Throughout the cooking cycle, other cooking liquids, such as another sauce no. 3, water, etc. can be selectively dispensed by the appropriate operation of the respective timer which controls the respective solenoid valve for the liquid.

At the end of time T1, the gas burner 6 is automatically shut off and the solenoid 28 is automatically de-energized to permit pan 4 to come to a stop. After the cooking cycle, water is dispensed through the inlet opening 72a of the nozzle 40 through the annular passageway 70 and the annular opening 71. Water is used to clean the pan 4 after the prepared food has been transferred to a dish. The nozzle opening 80 can also be cleaned at this time by introduction of water preferably through the inlet opening 72c.

The control circuit 49 is conveniently disposed in the control panel 48 to provide easy access for the user in adjusting the timers. Since the timers can be adjusted independently of each other in any sequence, the cooking device R can be effectively preprogrammed to prepare a variety of foods. The sequence depicted in FIG. 5 is only one of many possible combinations. Although the nozzle 40 is shown with a specific number of inlets, a person skilled in the art should understand that a lesser or greater number of inlets can be provided, depending on the specific need of the range of food expected to be cooked in the cooking device R. Also, a lesser or greater number of timers and solenoid valves can be made, depending on the needs of the user.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:
1. A cooking device, comprising:
   a) a base;
   b) a fulcrum mounted on said base;
   c) support means for carrying a pan;
   d) said support means being mounted on said fulcrum and including first and second portions extending respectively from each side of said fulcrum a substantial distance;
   e) means for mounting the pan on said first portion of said support means and on one side of said fulcrum; and
   f) actuating means operably associated with said second portion of said support means and on the other side of said fulcrum for periodically accelerating and decelerating rapidly said first portion about said fulcrum between first and second positions, thereby causing the pan to move upwardly and downwardly with said first portion and propel food placed therein into the air upon rapid upward deceleration and downward acceleration of said first portion and causing the food to be turned for uniform heating of different portions of the food.
2. A cooking device as in claim 1, wherein:
   a) said first portion is substantially longer than said second portion, whereby a small movement of said second portion is magnified into a large movement in said first portion.
3. A cooking device as in claim 1, wherein:
   a) said actuating means includes a solenoid.
4. A cooking device as in claim 1, wherein:
   b) said second portion includes a lost motion slot.
5. A cooking device as in claim 4, wherein:
   a) said actuating means includes a solenoid operably associated with said lost motion slot.
6. A cooking device as in claim 5, wherein:
   a) said solenoid includes a plunger disposed therein and moveable between third and fourth positions and a linkage operably associated with said plunger;

b) said linkage is operably associated with said lost motion slot;

c) whereby when said plunger moves between said third and fourth positions, said linkage causes said first portion to oscillate between said first and second positions.

7. A cooking device as in claim 1, wherein:

a) said actuating means includes a solenoid having a plunger; and b) means for lubricating said plunger.

8. A cooking device as in claim 7, and further comprising:

a) means for cooling said solenoid during operation.

9. A cooking device as in claim 8, wherein:

a) said cooling means includes a liquid jacket disposed around said solenoid; and b) means for circulating coolant liquid through said jacket.

10. A cooking device as in claim 8, wherein:

a) said lubricating means includes a pan disposed below said plunger; and b) said pan includes a chamber communicating with said plunger.

11. A cooking device as in claim 10, wherein:

a) said circulating means includes an inlet and an outlet;

b) said inlet is operably connected to a lower portion of said jacket;

c) said outlet is operably connected to an upper portion of said jacket; and d) said outlet includes a coil portion disposed within said pan chamber.

12. A cooking device as in claim 1, and further comprising:

a) a nozzle disposed over the pan.

13. A cooking device as in claim 12, wherein:

a) said nozzle includes inner and outer tubular members;

b) said inner member is disposed within said outer member for defining an annular passageway therebetween; and c) said inner member includes a plurality of inlets and an outlet.

14. A cooking device as in claim 12, wherein:

a) said outer member includes an inlet at its upper end and an annular opening at its lower end; and b) said annular opening communicates with said annular passageway.

15. A cooking device as in claim 14, wherein:

a) said inner member includes a chamber; and b) said inner member outlet has an opening substantially smaller than said chamber.

16. A cooking device as in claim 12, and further comprising:

a) burner means for providing heat to the pan.

17. A cooking device as in claim 16, and further comprising:

a) means for operating said solenoid, said nozzle, and said burner means in a preselected manner.

18. A cooking device as in claim 17, wherein:

a) said operating means includes a plurality of solenoid valves;

b) each of said solenoid valves is operably associated with each of said plurality of inlets and said burner means.

19. A cooking device as in claim 18, wherein:

a) said operating means includes timer means for operating each of said solenoid valves and said solenoid in a preselected sequence.

20. A cooking device, comprising:

a) a base;

b) support means operably associated with said base for carrying a pan;

c) pivot means operably associated with said support means for permitting said support means to oscillate from the horizontal between first and second positions;

d) solenoid drive means operably associated with said support means for periodically accelerating and decelerating rapidly said support means about said pivot between said first and second positions, thereby causing the pan to move upwardly and downwardly with said support means and propel food placed therein into the air upon rapid upward deceleration and downward acceleration of said support means and causing the food to be turned for uniform heating of different portions of the food; and e) means for automatically controlling the operation of said solenoid drive means in a preselected sequence.

21. A cooking device as in claim 20, wherein:

a) said controlling means includes timer means operably associated with said solenoid drive means for periodically operating said solenoid.

22. A cooking device as in claim 21, wherein:

a) said timer means includes an adjustable timer.

23. A food cooking device, comprising:

a) a base;

b) support means operably associated with said base for carrying a pan;

c) pivot means operably associated with said support means for permitting said support means to oscillate from the horizontal between first and second positions; and d) solenoid drive means operably associated with said support means for periodically accelerating and decelerating rapidly said support means about said pivot means between said first and second positions, thereby causing the pan to move upwardly and downwardly with said support means and propel food placed therein into the air upon rapid upward deceleration and downward acceleration of said support means and causing the food to be turned for uniform heating of different portions of the food.

* * * * *